United States Patent [19]
Castellon

[11] Patent Number: 5,830,071
[45] Date of Patent: Nov. 3, 1998

[54] TELESCOPIC SHAFT INCLUDING INTERCOOPERATING MALE AND FEMALE MEMBERS

[76] Inventor: Melchor Daumal Castellon, Diputacion, 455, 08013 Barcelona, Spain

[21] Appl. No.: 753,602

[22] Filed: Nov. 27, 1996

[30] Foreign Application Priority Data

Nov. 29, 1995 [ES] Spain ...................................... 9502347

[51] Int. Cl.$^6$ ....................................................... F16D 3/06
[52] U.S. Cl. ........................... 464/162; 403/359; 464/157
[58] Field of Search .................................... 464/157, 158, 464/162, 179, 183; 403/359, 298

[56] References Cited

U.S. PATENT DOCUMENTS

| | | | |
|---|---|---|---|
| 1,541,007 | 6/1925 | Theimer | 464/162 |
| 2,992,548 | 7/1961 | Walterscheid-Muller et al. | 464/162 |
| 3,473,406 | 10/1969 | Runkle | 464/162 X |
| 3,805,552 | 4/1974 | Heald | 464/162 |
| 3,995,914 | 12/1976 | Schardt et al. | 464/162 X |
| 4,254,674 | 3/1981 | Strussion et al. | 464/162 X |
| 4,406,641 | 9/1983 | Mallet | 464/162 |
| 4,601,182 | 7/1986 | Glanzmann | 403/359 X |
| 4,622,022 | 11/1986 | Diffenderfer et al. | 464/162 |
| 4,662,775 | 5/1987 | Faul | 403/359 X |
| 4,682,069 | 7/1987 | Stahl | 403/359 X |
| 4,987,330 | 1/1991 | Murphy | 403/359 |
| 5,064,040 | 11/1991 | Johnson | 406/359 |

*Primary Examiner*—Eileen H. Dunn
*Attorney, Agent, or Firm*—Jacobson, Price, Holman & Stern, PLLC

[57] ABSTRACT

A telescopic shaft including a male member slidably fitted in the interior of a female member. The male and female members are rotatably locked by providing, on contact surfaces, a succession of small longitudinal ribs meshing with one another. One of the members includes at least one smooth longitudinal region devoid of ribs. The longitudinal region extends from one end of the one member to an intermediate point. The longitudinal region is engaged by a projection extending from the other member. The projection is directed towards the one member and acts as an abutment against the ends of the longitudinal region to limit the possibility of one member sliding with respect to the other member to prevent disassembly of the two members.

6 Claims, 1 Drawing Sheet

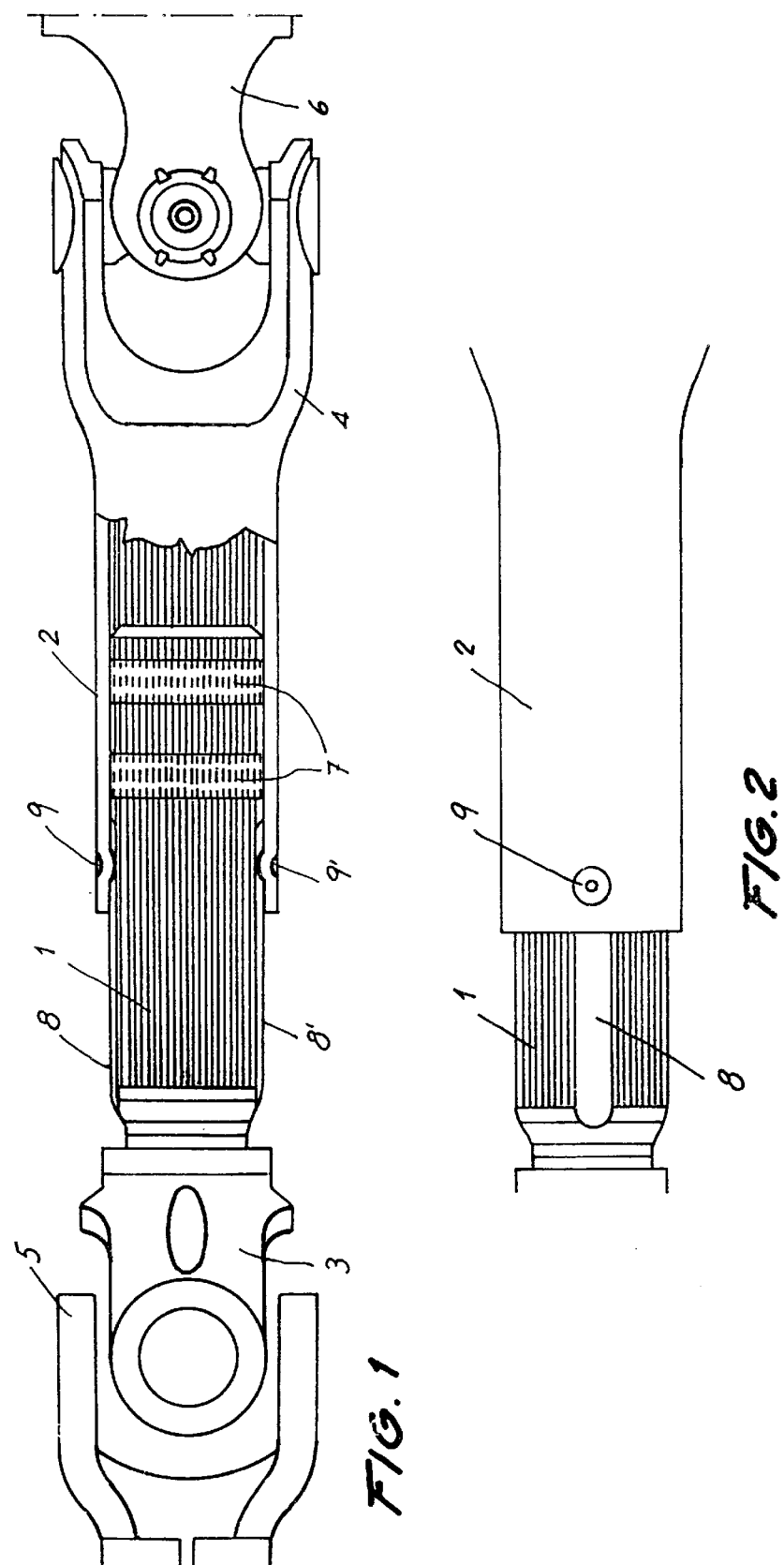

TELESCOPIC SHAFT INCLUDING INTERCOOPERATING MALE AND FEMALE MEMBERS

FIELD OF THE INVENTION

The present invention relates to an improved arrangement applicable to telescopic shafts.

BACKGROUND OF THE INVENTION

More specifically, the present invention relates to telescopic shafts formed by two tubular segments fitted one inside the other and provided on their contacting surfaces with a succession of longitudinal ribs and grooves which engage with one another allowing rotatable locking between said segments. These telescopic shafts are well known as such and are regularly used in the car industry, preferably in steering shafts, that is in the shafts which transmit to the wheels the turning movements which the vehicle driver imparts to the steering wheel.

As is also well known, to provide protection from possible accidents and also to facilitate assembly, it is normal for the steering shafts to be broken down into two or more sections which are articulated to one another by means of cardan joints. During assembly in such a case, employing the possibilities of sliding which exist between the two tubular segments making up each section, the male tubular segment relatively frequently issues totally from the female tubular segment in which it is engaged—especially in the case of secondary sections of reduced length ("splines") obliging the operator to perform relatively complicated manoeuvres which have a very significant effect on the working rate.

SUMMARY OF THE INVENTION

The present invention relates specifically to a simple and ingenious arrangement which allows said drawback to be eliminated completely, limiting the possibilities for the male tubular segment to slide with respect to the female tubular segment On the other hand, according to said arrangement, the holding effect is achieved with great simplicity of means and virtually without affecting the production costs.

BRIEF DESCRIPTION OF THE DRAWINGS

Furthermore, the essence and the main characteristics and advantages of the invention will emerge more clearly from the accompanying drawings to which the description refers hereinafter and which show a preferred embodiment of the device in a schematic and non-limiting manner.

FIG. 1 is a partially sectional side view of a telescopic shaft unit incorporating said arrangement.

FIG. 2 is a partial view of the same telescopic shaft shown in the preceding figure orthogonally to this figure.

DETAILED DESCRIPTION OF THE PREFERRED EMBODIMENTS

With reference to these drawings, the telescopic shaft to which the invention applies has a well known structure and consists of two tubular segments 1–2 although the internal element or male element can also consist, in some cases, of a solid metal rod Each of these elements has a fork 3–4 connected to its end, with which it can optionally constitute a single part, these forks being arranged so as to link, by means of the corresponding cross members with other complementary forks 5–6 so as to form the cardan joints by means of which the shaft is joined to the elements of interest in each case (the main section of the steering shaft and the knuckle of the steering mechanism respectively in normal cases). As is also well known, said tubular segments 1–2 have a succession of small longitudinal ribs in their contacting surfaces forming a type of teeth, commonly called "broaching", which guarantees the rotatable locking, that is enables the unit to transmit rotational forces. Between these two elements, it is possible to insert some rings of elastic material moulded, for example, directly on the internal element or male element 1 to guarantee exact engagement therebetween, eliminating noise and vibrations and also developing a certain braking action which opposes the movements of one of said elements with respect to the other.

According to the invention, one of the two integral elements of the telescopic shaft, preferably but not necessarily the male element 1, essentially has at least one longitudinal region 8 deprived of longitudinal ribs which extends from one end to an intermediate point displaced more or less toward the opposite end. And likewise, a recessed point 9 provided in the other constituent element of the telescopic shaft, that is normally the female element, essentially engages in this smooth region 8. In this way, the possibilities for the male element 1 to slide with respect to the female element 2 are limited by the length of the smooth longitudinal region 8, the recessed point 9 developing an abutment effect with the beginning of the longitudinal ribs thereof when it reaches the end of said region, making it impossible to remove one tubular member from the other.

It is obvious that said abutment effect is achieved perfectly with a single recess 9 which engages in a single smooth region 8. However, in a preferred embodiment, there are two diametrically opposed smooth regions 8—8' in which two corresponding recesses 9—9' engage. This allows the forces which the unit has to withstand to be largely balanced and also facilitates the production of the recesses 9—9' which would normally have to be made after assembly, that is after the male member 1 has been fitted into the interior of the female member 2 The member of smooth regions and recesses can obviously be increased to three, four or even more, preferably distributes evenly round the periphery of said elements.

The invention obviously allows numerous variations which must be considered to be integrally included in the scope thereof without affecting its essence.

I claim:

1. A telescopic shaft for a steering shaft of an automobile, said telescopic shaft comprising:

a male member slidably fitted in the interior of a female member, said male and female members being rotatably locked by providing, on contacting surfaces, a succession of small longitudinal ribs meshing with one another, one of said members including at least one smooth longitudinal region deprived of ribs extending from one of two ends to an intermediate point of the one member, the other of said two ends being located in engagement with the other member, said longitudinal region being engaged by a projection extending from and formed homogeneous with the other of said members and being directed toward the one member and acting as an abutment against a beginning of the longitudinal region of the other member when an opposite end of the longitudinal region located at said intermediate point of said one member is reached, limiting the possibility for the one member to slide with respect to the other member and preventing disassembly of the telescopic shaft by the separation of the two members.

2. Arrangement according to claim 1, wherein the projection provided on said other of the members consists of a radially inwardly directed projection directed toward the one member.

3. Arrangement according to claim 1, wherein the smooth longitudinal region deprived of ribs is arranged on the male member while the projection which engages in this region consists of a radially inwardly extending projection produced in the other member after assembly.

4. Arrangement according to claim 1, wherein the at least one longitudinal region is located on the male member and comprises two smooth longitudinal regions deprived of ribs which are diametrically opposed and in which there engage and along which there can slide two corresponding diametrically opposed projections made in the other member after assembly.

5. Arrangement according to claim 1, wherein said longitudinal ribs surround said one member except for said longitudinal region.

6. Arrangement according to claim 1, wherein said longitudinal region defines a depression between adjacent ones of said longitudinal ribs.

* * * * *